Nov. 17, 1942.　　A. LEKSUTIN　　2,302,654
BICYCLE LOCK
Filed May 13, 1941　　2 Sheets-Sheet 1
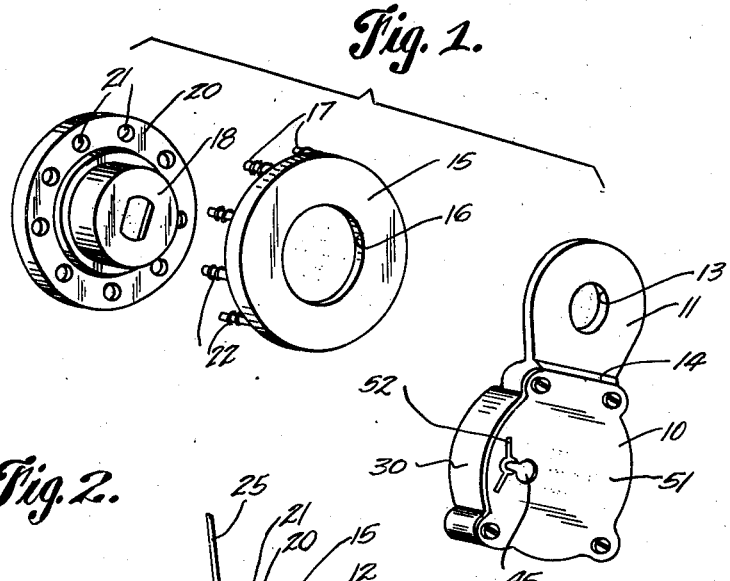
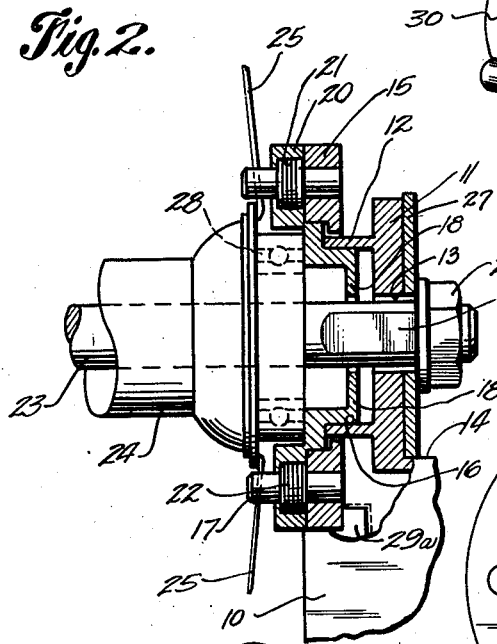
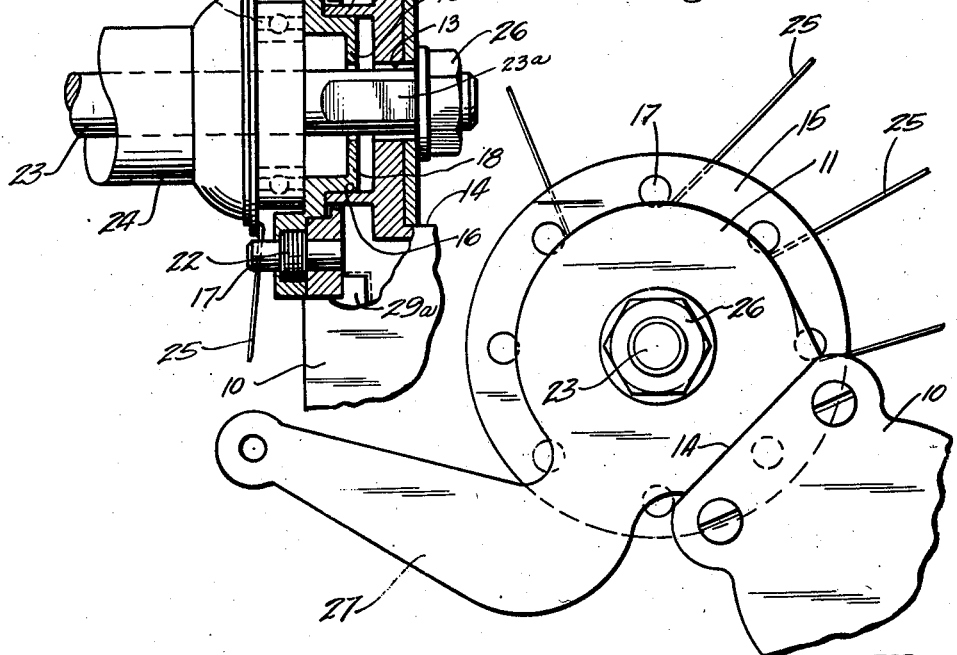
INVENTOR.
ALEX LEKSUTIN.
BY Louis Chayka Nov. 17, 1942.　　　A. LEKSUTIN　　　2,302,654
BICYCLE LOCK
Filed May 13, 1941　　　2 Sheets-Sheet 2
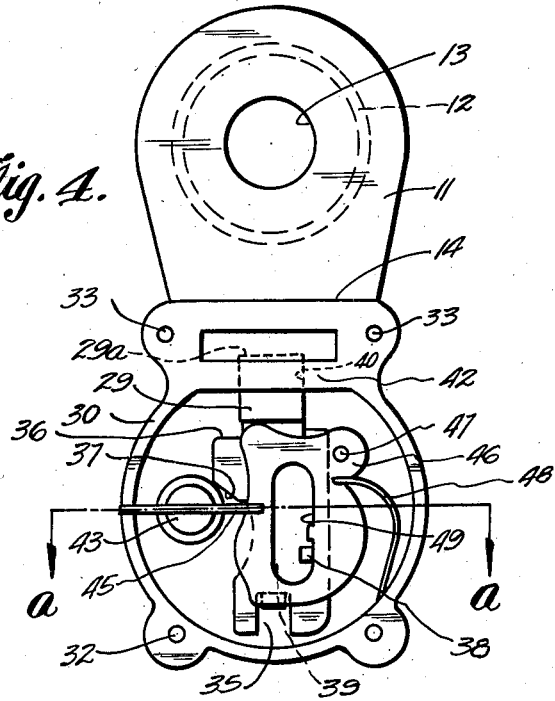
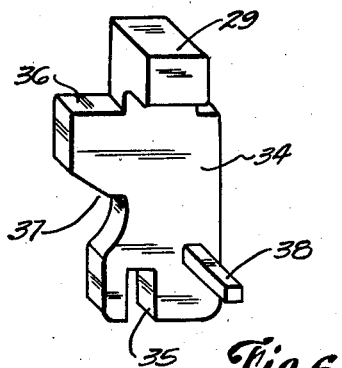
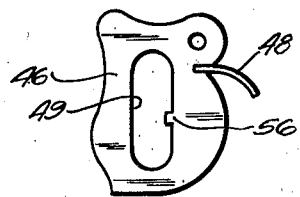
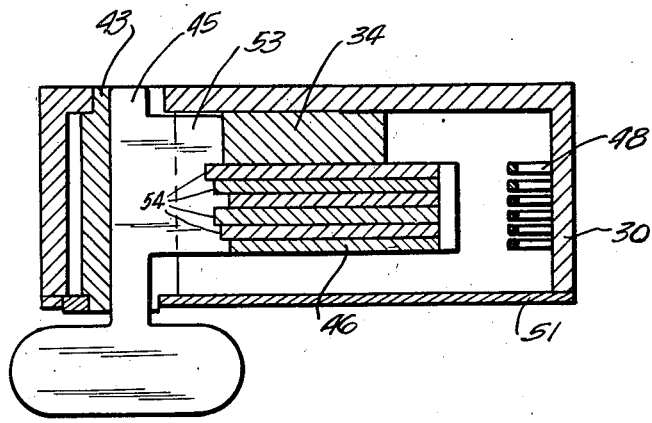
INVENTOR.
ALEX. LEKSUTIN.
BY Louis Chenjker Patented Nov. 17, 1942

2,302,654

UNITED STATES PATENT OFFICE 2,302,654

BICYCLE LOCK

Alex Leksutin, Detroit, Mich.

Application May 13, 1941, Serial No. 393,277

3 Claims. (Cl. 70—227)

The purpose of my invention is to provide a lock of simple construction which can be readily installed on a bicycle without the necessity of any changes in its, the bicycle's, construction.

Another purpose of my invention is to provide a lock with a minimum of working parts and yet of such design that the locking is positive and efficient.

I shall now describe my invention with reference to the accompanying drawings:

Fig. 1 is what is known as an exploded view of the principal parts of my lock, in perspective.

Fig. 2 is a sectional view of my lock as assembled and installed upon the axle of a bicycle.

Fig. 3 is a fragmentary side elevation of my lock as installed upon the axle of a bicycle.

Fig. 4 is a plan view of the inner mechanism of one element of my lock.

Fig. 5 is a bolt constituting a part of the mechanism shown in Fig. 4.

Fig. 6 shows a plan view of another component part of the mechanism shown in Fig. 4.

Fig. 7 shows a sectional view of the unit shown in Fig. 4 on line a—a.

Similar numerals refer to similar parts throughout the several views.

The lock invented by me is of the type which may be mounted upon the axle of a bicycle and which locks the wheel in a fixed position with respect to said axle by interposing a number of metal pins between the spokes of the bicycle wheel. The principal parts of the lock are shown in Fig. 1 and consist of a padlock type member 10 and cooperative members 15 and 20. The casing 30 of the padlock 10 forms a flat ear 11 extending in the plane of member 10, the ear being provided on one side with a projecting annular boss 12, shown more clearly, in section, in Fig. 2. 13 indicates an axial circular aperture in said ear. On the line of conjunction between the casing 30, with said ear 11, said casing forms a flat shoulder 14. Annular member 15 is intended to adjoin said ear 11 in such a manner that the circular aperture 16 of said annular member 15 fits snugly over the projecting boss 12. A plurality of pins 17 are disposed circumferentially on the flat surface of ring 15, further remote from the ear 11. The pins are adapted to fit into apertures 21 disposed circumferentially on member 20, which is of the same diameter as member 15 and is provided with an axially disposed hub 18 intended to fit through the central opening 16 into the space within the boss 12 on ear 11. Coiled springs 32 serve to keep member 15 and member 20 normally in a spaced relation to each other. The outline of the central opening in hub 18 may include two parallel sides, as shown, to prevent member 20 from rotating upon the stationary axle 23 upon which it is seated. A part of that axle is provided with correspondingly flattened sides, said part being indicated by numeral 23a.

The three members 10, 15 and 20, when assembled, are in such respective relation to each other as shown in Fig. 2, wherein 23 indicates the axle of the bicycle, 24 being the hub of the wheel mounted on said axle, 25 being wire spokes, and 28 indicating an annular ball-bearing race. When the three parts are properly assembled and mounted on the axle, as shown, the flat shoulder 14 of the padlock member 10 bears against a straight line side of a brake arm 27, which forms a part of the bicycle, the brake arm being in a fixed position with respect to the axle. It will be understood that my lock, including all three principal parts, is in a fixed position with respect to said axle, irrespective of the rotation of the bicycle wheel thereon. A nut 26 at the end of axle 23 serves to retain the brake arm 27 and the lock adjoining thereto in position.

Up to this time I restricted myself to the description of the principal parts of my lock, without going into any details as to the construction of the inner mechanism of member 10. Now I shall point out the working elements in said member 10, with particular reference to Figs. 4 to 7 inclusive. The casing of the lock is indicated by numeral 30 and is preferably made in one piece with a flat cover 51, in which 52 indicates a keyhole extending radially in opposite directions. Disposed on the bottom of the casing is a slidable bolt 34 terminating at one end in a lock finger 29, while at the other side it contains a slot 35 disposed in the direction of the longitudinal axis of said bolt. On one side the bolt contains a substantially V-shaped incision 37. 36 indicates a transversely disposed shoulder. A square pin 38 projects from the surface of the bolt at a right angle thereto.

The sliding reciprocal movement of bolt 34 is limited at one side by a stop 39, which rises from the bottom of the casing and fits into slot 35, and at the other side the movement of said bolt is limited by a cross-bar 42, which contains a gate 40 for the passage of lock finger 29 but which bears against shoulder 36 to limit the motion of said bolt. Adjoining said bolt 34 on the side of the incision 37 is a key column 43 slotted on one side to accommodate a key 45. The column is rotatably mounted within the casing.

Superimposed upon said bolt 34 are a number of leaflike tumblers 46. They are all pivoted on pin 47 within the casing, individual springs 48 urging said leaves in the direction of the key. Each leaf contains in its midsection a longitudinal slot 49, one side of the slot forming a tooth 56 extending inwardly. When mounted upon pin 47, the tooth on each leaf is in the path of pin 38 on bolt member 34. The edge of each leave adjoining the key is out of alignment with the edges of the adjoining leaves and this may be said about the respective teeth 56 on said leaves.

When key 45 is inserted into the slotted column 43, its operative edge 53 fits into the incision 37 of bolt 34 and serves to slide the bolt upwardly through the gate in bar 42 or to retract the bolt back into the casing. Assuming that the bolt is in a retracted position, it may be shifted toward a locking position only when teeth 56 on tumblers 46 are out of the way of pin 48 on said bolt. In order to shift the teeth out of the way, each leaf 46 must be swung on its pivot 47 in a direction away from the key, and this can be done by means of key 45 only when notches 54 on the operative edge 53 of the key effect a displacement of each leaf just to a predetermined extent. If the key does not fit, this cannot be accomplished. When, by means of a suitable key, each of the leaves is swung out sufficient to remove the teeth 56 out of the way of pin 38, the bolt may be shifted into a locking position to a point shown in Fig. 2.

I shall now describe the manner in which member 10 cooperates in conjunction with members 15, 20 and the bicycle to which the lock is applied. Normally, when the lock is mounted on the bicycle wheel as shown in Figs. 2 and 3, members 15 and 16 are spaced apart by means of springs 17 and member 15 is sufficiently out of the way of the wheel revolving with hub 24, to be out of the way of spokes 25. When, however, it is intended to lock the wheel in a fixed position with respect to the axle 23, member 15 may be pressed manually towards member 20 against the tension of springs 22, pins 17 being disposed within corresponding apertures 21. This manual pressure will shift the position of member 15 to a point where pins 17 will extend beyond the outer surface of member 20 and will project between spokes 25 of the bicycle wheel. To retain members 15 and 20 in this relative position, bolt 34 may be caused by means of key 45 to shift outwardly to a position abutting the side of member 15 as shown in Fig. 2. This will effect a locking engagement between pins 17 and spokes 25 so that the bicycle wheel will be locked in its respective position to axle 23. When by means of a key 45 the bolt is withdrawn into the casing 30, springs 22 will automatically act to disengage member 15 with pins 17 from the wheel locking position.

By way of supplementing my description, I wish to add that cover 52 on member 10 may be secured to said member by means of bolts or screws fitting into apertures 32 and 33, as shown in Fig. 4.

It will be seen that changes may be introduced in the construction of my lock without departing from the principle underlying my invention. What I, therefore, wish to claim is as follows:

1. In a bicycle lock of the kind described, a padlock including a flat ear in the plane thereof and diposed axially with respect to the axle of the bicycle wheel, a disc-like member including a hub fitting into said ear, said disc being provided with a plurality of peripheral openings, an annular member between the ear and the disc containing a plurality of peripherally disposed pins adapted to project through the openings in the disc and into the path of the spokes of the bicycle wheel, to lock same with respect to the axle, spring means between the disc and the annular member to keep the ring and the pins normally out of engagement with the spokes of the wheel, and bolt means in the padlock to retain the ring and the pins in an operative spoke-locking position.

2. A bicycle lock of the kind described, adapted to be mounted on the axle of a bicycle wheel in a fixed relation thereto, said lock comprising a padlock member including an ear embracing the end of said axle and provided with a circular recess therein, a disc provided with a hub fitting into said recess in said ear and provided with a plurality of peripheral openings, a manually movable annular member between the ear and the disc, axially slidable on the hub of the disc and provided with a plurality of pins peripherally disposed thereon and adapted to project through said openings into the path of the spokes of the bicycle wheel, spring means to keep the pins and the spokes normally out of engagement, and bolt means adapted to be moved radially with respect to the ring against the side thereof, to retain same in an operative spoke-locking position.

3. A bicycle lock of the kind described, adapted to be mounted on the axle of a bicycle wheel in a fixed relation thereto, said lock comprising a padlock member including a flat, substantially circular ear disposed axially with respect to said wheel, and containing a circular recess therein, a disc provided with a hub fitting into said recess, and provided with a plurality of peripheral openings, an annular member between the ear and the disc, axially movable on the hub of the disc and provided with a plurality of pins peripherally disposed thereon and adapted to project through said openings into the path of the spokes of the bicycle wheel to lock them in place with respect to the axle thereof, spring means to keep the pins and the spokes normally out of engagement, and key operated bolt means within the padlock adapted to move radially against the side of the ring, to retain the pins thereon in the path of said spokes.

ALEX LEKSUTIN.